United States Patent
Tang

(10) Patent No.: US 11,206,636 B2
(45) Date of Patent: Dec. 21, 2021

(54) PAGING MESSAGE SENDING METHOD AND DEVICE AND COMPUTER STORAGE MEDIUM

(71) Applicant: GUANGDONG OPPO MOBILE TELECOMMUNICATIONS CORP., LTD., Guangdong (CN)

(72) Inventor: Hai Tang, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 3 days.

(21) Appl. No.: 16/889,350

(22) Filed: Jun. 1, 2020

(65) Prior Publication Data

US 2020/0296685 A1 Sep. 17, 2020

Related U.S. Application Data

(63) Continuation of application No. PCT/CN2017/114327, filed on Dec. 1, 2017.

(51) Int. Cl.
  *H04W 68/00* (2009.01)
  *H04W 76/28* (2018.01)
  (Continued)

(52) U.S. Cl.
  CPC ....... *H04W 68/005* (2013.01); *H04L 27/2655* (2013.01); *H04W 56/001* (2013.01);
  (Continued)

(58) Field of Classification Search
  CPC ...... H04L 27/2655–2681; H04W 56/00–0095; H04W 68/00–12;
  (Continued)

(56) References Cited

U.S. PATENT DOCUMENTS

| 4,680,786 A * | 7/1987 | Baker ................ H04W 84/042 |
| | | 455/461 |
| 9,872,272 B2 | 1/2018 | Mochizuki |

(Continued)

FOREIGN PATENT DOCUMENTS

| CN | 103120002 A | 5/2013 |
| CN | 107018496 A | 8/2017 |

(Continued)

OTHER PUBLICATIONS

Supplementary European Search Report in the European application No. 17933610.2, dated Dec. 2, 2020.

(Continued)

*Primary Examiner* — Ronald Eisner
(74) *Attorney, Agent, or Firm* — Ladas & Parry LLP

(57) ABSTRACT

Disclosed are a paging message sending method and device, and a computer storage medium. The method comprises: a network determining the maximum number of paged UEs of a paging message according to paging configuration parameters, the paging configuration parameters comprising configuration information of a paging time unit and information concerning the maximum number of paged UEs corresponding to the paging time unit; the paging time unit comprising at least a first type of paging time unit and a second type of paging time unit, each type of paging time unit corresponding to the respective maximum number of paged UEs; the network sending a paging message according to the paging configuration parameters.

14 Claims, 8 Drawing Sheets

---

A UE receives a paging message sent by a network according to a paging configuration parameter. The paging configuration parameter is configured to determine the maximum number of UEs paged by the paging message. The paging configuration parameter includes configuration information of a paging time unit and information on a maximum number of paged UEs corresponding to the paging time unit, the paging time unit at least includes a first type of paging time unit and a second type of paging time unit, and different types of paging time unit correspond to maximum numbers of paged UEs

1001

(51) Int. Cl.
  *H04L 27/26* (2006.01)
  *H04W 56/00* (2009.01)
  *H04W 72/04* (2009.01)

(52) U.S. Cl.
  CPC ... *H04W 72/0446* (2013.01); *H04W 72/0453* (2013.01); *H04W 76/28* (2018.02)

(58) Field of Classification Search
  CPC ............ H04W 72/00; H04W 72/0446; H04W 72/0453; H04W 76/28; H04W 88/02; H04W 88/08
  See application file for complete search history.

(56) References Cited

U.S. PATENT DOCUMENTS

| | | |
|---|---|---|
| 2013/0203450 A1 | 8/2013 | Mochizuki |
| 2016/0234804 A1 | 8/2016 | Hu et al. |
| 2017/0064671 A1* | 3/2017 | Rashid .................. H04W 68/02 |
| 2018/0110027 A1 | 4/2018 | Mochizuki et al. |
| 2019/0254000 A1 | 8/2019 | Mochizuki et al. |
| 2020/0120633 A1* | 4/2020 | Mochizuki .............. H04W 4/70 |

FOREIGN PATENT DOCUMENTS

| | | |
|---|---|---|
| EP | 2624644 A1 | 8/2013 |
| WO | 2015051547 A1 | 4/2015 |
| WO | 2017190269 A1 | 11/2017 |

OTHER PUBLICATIONS

"3rd Generation Parnership Project; Technical Specification Group Radio Access Network; Evolved Universal Terrestrial Radio Access (E-UTRA); Radio Resource Control (RRC); Protocol specification (Release 11)" 3GPP TS 36.331 V11.18.0 (Sep. 2017) http://www.3gpp.org.

Written Opinion of the International Search Authonty in the international application No. PCT/CN2017/114327, dated Aug. 24, 2018.

OPPO. "R1-1720001, On NR Paging Design" 3GPP TSG RAN WG1 Meeting #91, Nov. 18, 2017 (Nov. 18, 2017), section 2, and figures 1-2.

International Search Report in the international application No. PCT/CN2017/114327, dated Aug. 24, 2018.

Office Action of the Indian application No. 202027027574, dated Jun. 29, 2021.

* cited by examiner

| PSS | PBCH | SSS | PBCH |

A UE receives a paging message sent by a network according to a paging configuration parameter. The paging configuration parameter is configured to determine the maximum number of UEs paged by the paging message. The paging configuration parameter includes configuration information of a paging time unit and information on a maximum number of paged UEs corresponding to the paging time unit, the paging time unit at least includes a first type of paging time unit and a second type of paging time unit, and different types of paging time unit correspond to maximum numbers of paged UEs  — 1001

FIG. 10

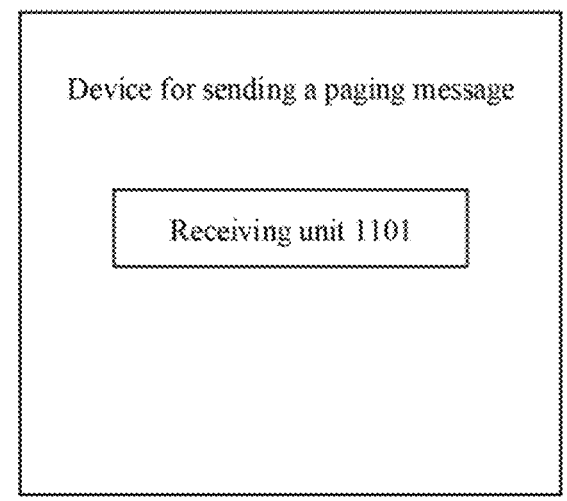

FIG. 11

PAGING MESSAGE SENDING METHOD AND DEVICE AND COMPUTER STORAGE MEDIUM

CROSS-REFERENCE TO RELATED APPLICATIONS

This is a continuation application of International Patent Application No. PCT/CN2017/114327, filed on Dec. 1, 2017, the disclosure of which is hereby incorporated by reference in its entirety.

BACKGROUND

In a Long Term Evolution (LTE) system, a network may initiate paging to User Equipment (UE) in an idle state and UE in a connection state. For UE, the UE receives a paging message in a paging time unit in a Paging Frame (PF) in a Discontinuous Reception (DRX) period.

In the LTE system, one paging message supports up to 16 UEs, namely at most 16 UEs may be simultaneously paged in one paging time unit. The maximum number of UEs supported by a paging message is determined by a parameter maxPageRec in a system message. In the LTE system, there are no specific limits and differences for sizes of time-frequency resources carrying paging messages, so that all paging messages support the same maximum number of UEs, which is 16.

However, in some scenarios, for example, paging time units are of different types of time-frequency resources. Therefore, it is impossible to differently configure corresponding parameters maxPageRec for different paging messages, resulting in a high paging message overhead.

SUMMARY

The disclosure relates to the technical field of wireless communication, and particularly to a method and device for sending a paging message, and a computer storage medium.

A first aspect provides a method for sending a paging message, which may include the following operations.

A network determines the maximum number of UEs paged by a paging message according to a paging configuration parameter. The paging configuration parameter includes configuration information of a paging time unit and information on the maximum number of paged UEs corresponding to the paging time unit. The paging time unit at least includes a first type of paging time unit and a second type of paging time unit. The different types of paging time units correspond to the maximum numbers of paged UEs, respectively.

The network sends the paging message according to the paging configuration parameter.

A second aspect provides a method for receiving a paging message, which may include the following operations.

A UE receives a paging message sent by a network according to a paging configuration parameter. The paging configuration parameter is configured to determine the maximum number of UEs paged by the paging message, the paging configuration parameter includes configuration information of a paging time unit and information on the maximum number of paged UEs corresponding to the paging time unit. The paging time unit at least includes a first type of paging time unit and a second type of paging time unit. The different types of paging time units correspond to the maximum numbers of paged UEs, respectively.

A third aspect provides a device for sending a paging message, which may include a transmission device.

The transmission device may be configured to receive a paging message sent by a network according to a paging configuration parameter. The paging configuration parameter is configured to determine the maximum number of UEs paged by the paging message, the paging configuration parameter includes configuration information of a paging time unit and information on the maximum number of paged UEs corresponding to the paging time unit. The paging time unit at least includes a first type of paging time unit and a second type of paging time unit. The different types of paging time units correspond to the maximum numbers of paged UEs, respectively.

BRIEF DESCRIPTION OF THE DRAWINGS

The drawings described herein are used to provide a further understanding to the disclosure and form a part of the application. Schematic embodiments of the disclosure and descriptions thereof are used to explain the disclosure and not intended to form improper limits to the disclosure. In the drawings:

FIG. 10 is a second flowchart of a method for sending a paging message according to an embodiment of the disclosure.

FIG. 11 is a second structure composition diagram of a device for sending a paging message according to an embodiment of the disclosure.

DETAILED DESCRIPTION

For making the technical solutions of the embodiments of the disclosure convenient to understand, key technologies involved in the embodiments of the disclosure will be explained and described below.

1) Beam in 5th Generation (5G)

Figures 1, 2:
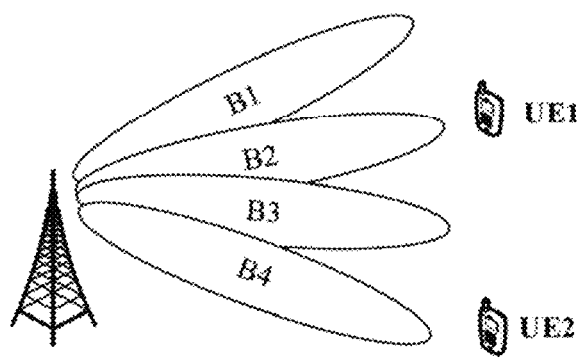
FIG. 1 is a schematic diagram of sending a wireless signal by a base station through a beam.
FIG. 2 is a schematic diagram of an SS block.

Since a frequency band for a 5G system is higher than that for an LTE system, path loss of transmission of wireless signals in the 5G system is greater than that of the LTE system, resulting in a small coverage range of a wireless signal of the 5G system. Therefore, in the 5G system, a beamforming technology is adopted to form a beam through a multi-antenna system of a base station, so as to increase a gain of the wireless signal and compensate for the path loss. In the beamforming technology, a beam is directional, and a narrow beam may cover only a part of region rather than the whole region of the cell. As shown in FIG. 1, the base station may send signals through four beams (B1, B2, B3 and B4) in different directions. The beam B2 may cover only UE1 and cannot cover UE2.

2) Synchronization Signal (SS) block in 5G

A common channel and common signal, for example, a broadcast channel and a synchronization signal, in the 5G system are required to cover a whole cell in a multi-beam scanning manner, such that UE in the cell may receive these signals. Multi-beam sending for the synchronization signal is implemented by defining an SS burst set. An SS burst set includes one or more SS bursts, and an SS burst includes one or more SS blocks (which may also be abbreviated as SSB). An SS block is configured to bear an SS and a broadcast channel of a beam. Therefore, an SS burst set may include SSs of beams, the number of which is equal to the number (SS block number) of SS blocks in the cell. As shown in FIG. 2, an SS block includes a Primary Synchronization Signal (PSS) of one symbol, a Secondary Synchronization Signal (SSS) of one symbol and a Physical Broadcast Channel (PBCH) of two symbols.

The number L of SS blocks in an SS burst set is determined according to a frequency band of the system. For example: L=4 for a frequency band of 3 GHz; L=8 for a band from 3 GHz to 6 GHz; and L=64 for a band from 6 GHz to 52.6 GHz.

Figure 3:
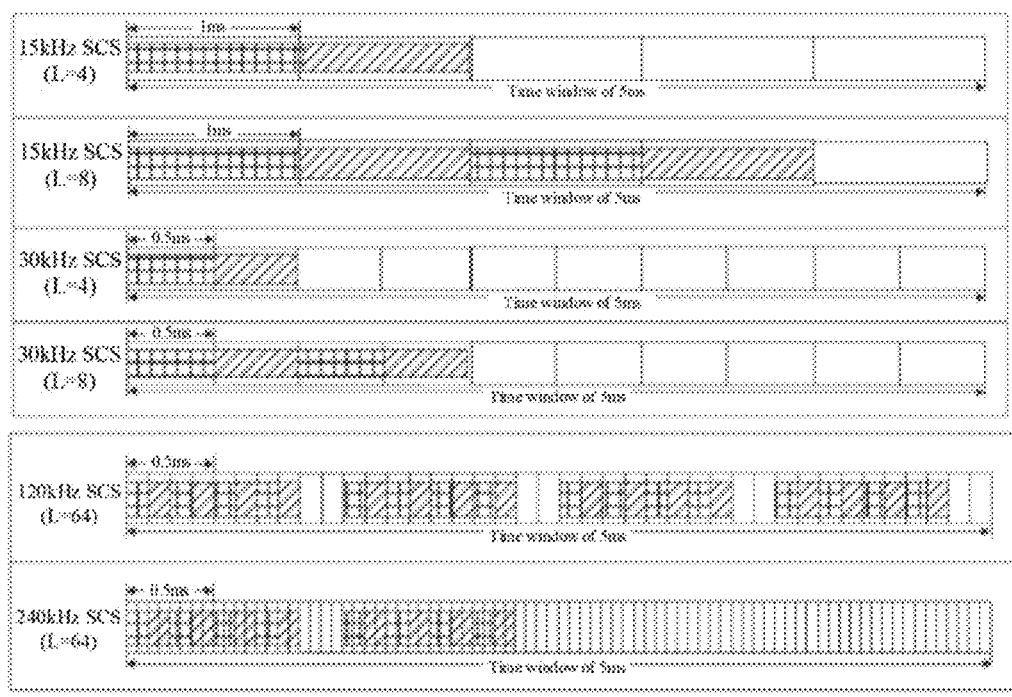
FIG. 3 is a diagram of slot distributions under different subcarrier spacings and frequency bands.

A sending period of an SS burst set may be configured. In an example, an SS burst set in a period is sent in a time window of 5 ms. In addition, a subcarrier spacing (SCS) of the system may also be configured, and slot distributions under different SCSs and frequency bands are shown in FIG. 3. FIG. 3 respectively illustrates the following conditions from top to bottom: a slot distribution of an SS burst set in a case of an SCS of 15 KHz and L=4 (corresponding to the frequency band of 3 GHz); a slot distribution of an SS burst set in a case of an SCS of 15 KHz and L=8 (corresponding to the frequency band from 3 GHz to 6 GHz); a slot distribution of an SS burst set in a case of an SCS of 30 KHz and L=4 (corresponding to the frequency band of 3 GHz); a slot distribution of an SS burst set in a case of an SCS of 30 KHz and L=8 (corresponding to the frequency band from 3 GHz to 6 GHz); a slot distribution of an SS burst set in a case of an SCS of 120 KHz and L=64 (corresponding to the frequency band from 6 GHz to 52.6 GHz); and a slot distribution of an SS burst set in a case of an SCS of 240 KHz and L=64 (corresponding to the frequency band from 6 GHz to 52.6 GHz).

Figure 4:
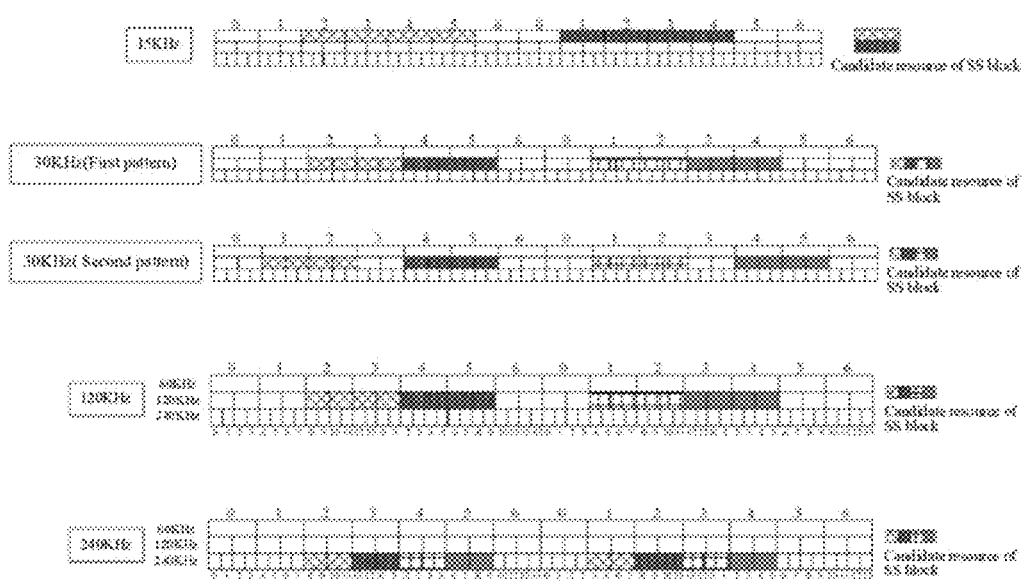
FIG. 4 is a diagram of distributions of SS blocks under different subcarrier spacings.

Furthermore, regarding a distribution of SS blocks in a slot, the slot includes 14 symbols and may carry at most two SS blocks. Distributions of SS blocks for different SCSs are shown in FIG. 4. FIG. 4 respectively illustrates the following conditions from top to bottom: a distribution of SS blocks in a slot in a case of an SCS of 15 KHz; a first distribution of SS blocks in a slot in a case of an SCS of 30 KHz; a second distribution of SS blocks in a slot in a case of the SCS of 30 KHz; a distribution of SS blocks in a slot in a case of an SCS of 120 KHz; and a distribution of SS blocks in a slot in a case of an SCS of 240 KHz.

In the solution, although the number L of the SS blocks is determined according to the frequency band of the system, L indicates a maximum number of the SS blocks, and the number of SS blocks practically sent by a network may be less than L. The number of the SS blocks practically sent by the network is indicated to UE, so that the US can perform rate matching. A time-frequency resource position where no SS block is sent may be configured to transmission another channel, for example, a Physical Downlink Shared Channel (PDSCH). Herein, information of the SS blocks practically sent by the network is indicated through Remaining Minimum System Information (RMSI).

Figure 5:
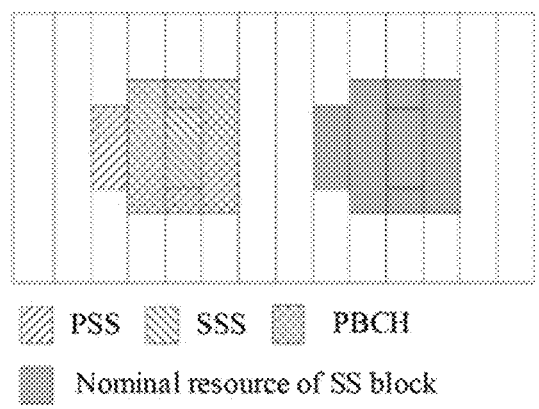
FIG. 5 is a diagram of a position distribution of predefined time-frequency resources where SS blocks are arranged in a slot.

A position distribution of predefined time-frequency resources, where SS blocks are arranged, in a slot is shown in FIG. 5. However, due to different periods of the SS blocks and different numbers of SS blocks that are practically sent, the predefined time-frequency resources are not necessarily configured to send SS blocks sent, and thus the predefined time-frequency resources are referred to as nominal resources of the SS blocks.

3) Paging in LTE

In an LTE system, a network may initiate paging to a UE in an idle state and a UE in a connection state. A paging process may be triggered by a core network or triggered by a base station, to send a paging request to the UE in the idle state, notify the UE of system information update, or notify the UE to receive Earthquake and Tsunami Warning System (ETWS) information and Commercial Mobile Alert Service (CMAS) information, etc. The base station, upon receiving paging messages of the core network, parses the paging messages to obtain a Tracking Area Identity list (TA list) of the UEs and performs air paging on cells in TAs in the TA list. Furthermore, the base station, upon receiving the paging messages of the core network, aggregates the paging messages having identical POs into one paging message, and transmits the paging message to the related UE through a paging channel. The UE receives a paging parameter through a system message, calculates the PO in combination with an International Mobile Subscriber Identification Number (IMSI) thereof and receives the paging message at a time corresponding to the PO according to the PO. Herein, the paging message is carried through a PDSCH, and the UE detects a Physical Downlink Control Channel (PDCCH) scrambled with a Paging Radio Network Temporary Identity (P-RNTI) to obtain paging instruction information, thereby receiving the paging message from the PDSCH. Furthermore, the UE in the idle state may save power by entering a DRX manner, and the UE acquires DRX related information from a System Information Block 2 (SIB2) and monitors the PDCCH scrambled with the P-RNTI at a PO in a PF in a DRX period to receive the paging message.

Figure 6:
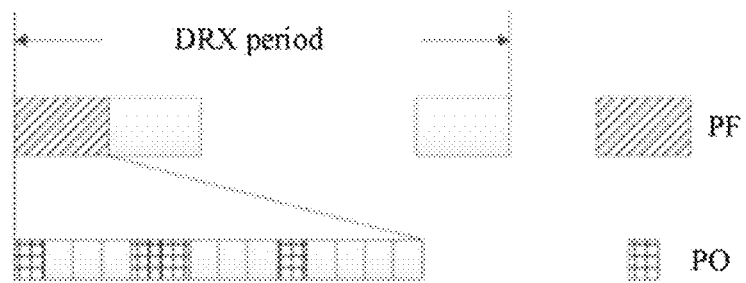
FIG. 6 is a distribution diagram of a PF and a PO.

In the solution, the PF indicates a System Frame Number (SFN) where the paging message should appear, and the PO indicates subframe time when the paging message may appear. A PF may include one or more PO subframes. In each DRX period or paging cycle, the UE only requires monitoring the PO subframe for itself. A distribution of PFs and POs is shown in FIG. 6. An SFN meeting the following formula may be taken as a PF.

$$\text{SFN mod } T = (T \text{ div } N)*(\text{UE\_ID mod } N).$$

T represents the DRX period or the paging cycle of the UE. If a default paging cycle in the SIB2 is denoted as T_sib, and if a DRX value T_ue of the UE has been configured, T=min(T_ue, T_sib), which indicates a minimum value of T_ue and T_sib. If T_ue is not configured, T=T_sib. UE_ID=(IMSI mode 1024), that is, all the IMSIs are divided into 1,024 UE groups, and the IMSI is unique for each UE. N=min(T, nB), which indicates a minimum value of T and nB. The parameter nB represents a paging density, nB is carried in the SIB2 and has a value range of {4T, 2, T, T/2, T/4, T/8, T/16, T/32}. Therefore, a value range of N is {T, T/2, T/4, T/8, T/16, T/32}. N represents the number of PFs in each period.

The position of the PO subframe is determined by an LTE system type (Frequency Division Duplex (FDD) or Time Division Duplex (TDD)) and the parameters Ns and i_s. Ns represents the number of paging subframes in each PF, i_s represents an index of the paging subframe, Ns=max(1, nB/T) and i_s=floor(UE_ID/N) mod Ns. As shown in Table 1 and Table 2, a value of Ns may be 1, 2 or 4. For example, if an LTE-FDD system is adopted, Ns=4, and if i_s=0, PO=0 and the paging message may be sent at the 0# subframe; and if i_s=2, PO=5 and the paging message may be sent at the 5# subframe. The UE determines the position of the PO for itself in a period according to POs in the cell and a UE_ID thereof. With this method, the UE is averagely distributed to different POs.

TABLE 1

(FDD)

| Ns | PO (i_s = 0) | PO (i_s = 1) | PO (i_s = 2) | PO (i_s = 3) |
|---|---|---|---|---|
| 1 | 9 | N/A | N/A | N/A |
| 2 | 4 | 9 | N/A | N/A |
| 4 | 0 | 4 | 5 | 9 |

TABLE 2

(TDD)

| Ns | PO (i_s = 0) | PO (i_s = 1) | PO (i_s = 2) | PO (i_s = 3) |
|---|---|---|---|---|
| 1 | 0 | N/A | N/A | N/A |
| 2 | 0 | 5 | N/A | N/A |
| 4 | 0 | 1 | 5 | 6 |

4) Paging in 5G

Figure 7:
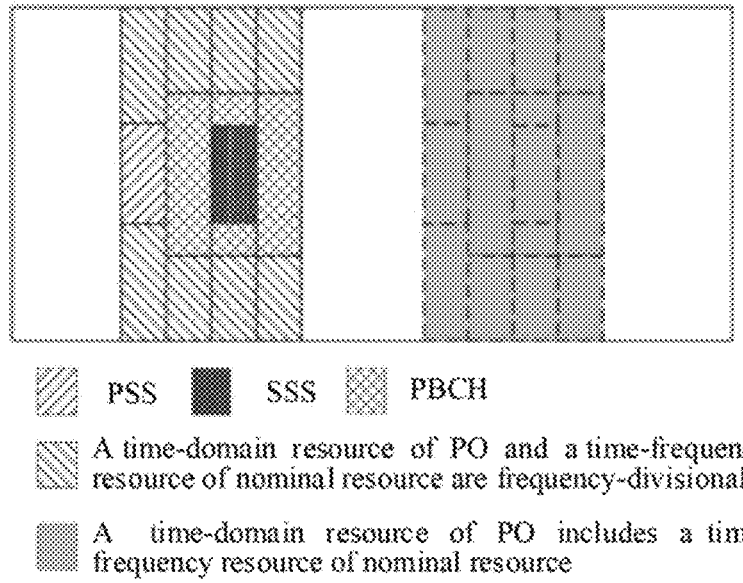
FIG. 7 is a distribution diagram of time-frequency resources of a PO.

For definitions about time-frequency resources of a PO in 5G, one definition is that a nominal resource corresponding to in SS block is configured for a time-frequency resource carrying a paging message in the PO. As shown in FIG. 7, on a symbol where a nominal resource practically sending an SS block is arranged, a time-frequency resource corresponding to a PO and a time-frequency resource corresponding to the nominal resource are frequency-divisional, and the type of such time-frequency resource corresponding to PO is referred to as a first time-frequency resource type. On a symbol where a nominal resource for not sending the SS block is arranged, a time-frequency resource corresponding to the PO may include a time-frequency resource corresponding to the nominal resource, and the type of such time-frequency resource corresponding to the PO is referred to as a second time-frequency resource type.

The two time-frequency resource types of the PO in FIG. 7 may have different capabilities of carrying the paging message due to different time-frequency resource sizes. Particularly for the first type of time-frequency resource, since the time-frequency resource corresponding to the PO and the time-frequency resource corresponding to the nominal resource are frequency-divisional, and a total bandwidth should meet a minimum bandwidth capability of UE, a bandwidth configured to carry a paging message is limited. Further, the paging message is sent in a beam scanning manner, resulting in a high overhead. One overhead reduction manner is to increase the number of UEs that may be paged at each PO, thereby reducing the total number of sending the paging message. Based on this, since the size of the paging message increases with an increase of the number of the paged UEs, more time-frequency resources are required to carry the paging message.

For example, in an LTE system, a paging message carries a Serving-Temporary Mobile Subscriber Identity (S-TMSI) of paged UE, which includes 40 bits. The UE receives the paging message at a PO thereof, judges whether the paging message contains an S-TMSI thereof, and determines that the UE is paged if the paging message contains the S-TMSI thereof. The same paging message supports at most 16 UEs, that is, at most 16 UEs can be simultaneously paged at a PO. The maximum number of UEs supported by a paging message is determined by a parameter maxPageRec in a system message. In LTE, there are no specific limits and differences for sizes of time-frequency resources carrying paging, so that all paging messages support the uniform maximum numbers of UEs, i.e., 16.

In a 5G system, the PO includes two time-frequency resource types, and resources of the two time-frequency resource types are different in size. Further, for reducing a paging overhead, more UEs are required to be paged at each PO. In this scenario, the following technical solutions of the embodiments of the disclosure are provided.

Figure 8:
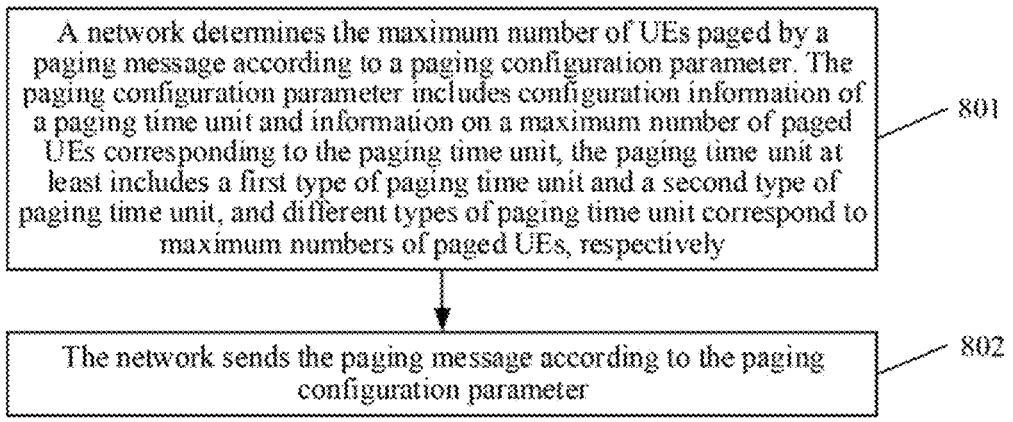
FIG. 8 is a first flowchart of a method for sending a paging message according to an embodiment of the disclosure.

FIG. 8 is a first flowchart of a method for sending a paging message according to an embodiment of the disclosure. As shown in FIG. 8, the method for sending a paging message includes the following operations.

At 801, a network determines the maximum number of UEs paged by a paging message according to a paging configuration parameter. The paging configuration parameter includes configuration information of a paging time unit and information on the maximum number of paged UEs corresponding to the paging time unit. The paging time unit at least includes a first type of paging time unit and a second type of paging time unit, and different types of paging time units correspond to maximum numbers of paged UEs respectively.

In the embodiment of the disclosure, the first type of paging time unit and the second type of paging time unit correspond to different maximum numbers of paged UEs.

In the embodiment of the disclosure, the first type of paging time unit corresponds to a first type of time-frequency resource, and the second type of paging time unit corresponds to a second type of time-frequency resource.

In the solution, the first type of time-frequency resource is different from the second type of time-frequency resource. Herein, the first type of time-frequency resource being different from the second type of time-frequency resource refers to following conditions.

1) A time-frequency resource size corresponding to the first type of time-frequency resource is different from a time-frequency resource size corresponding to the second type of time-frequency resource.

2) A time-frequency resource multiplexing manner of the first type of time-frequency resource with an SS block is different from a time-frequency resource multiplexing manner of the second type of time-frequency resource with the SS block.

3) The time-frequency resource size corresponding to the first type of time-frequency resource is different from the time-frequency resource size corresponding to the second type of time-frequency resource, and the time-frequency resource multiplexing manner of the first type of time-frequency resource with the SS block is different from the time-frequency resource multiplexing manner of the second type of time-frequency resource with the SS block.

In the solution, the paging time unit includes a PO or a part of time units in the PO.

On a symbol where a nominal resource for sending the SS block is arranged, a time-frequency resource corresponding to the first type of paging time unit and the nominal resource are frequency-divisional. On a symbol where a nominal resource for not sending the SS block is arranged, a time-frequency resource corresponding to the second type of paging time unit may include a time-frequency resource where the nominal resource is arranged.

In the embodiment of the disclosure, the paging configuration parameter may be acquired from a system message. For example, a paging configuration parameter maxPageRec 1=16 is acquired from the system message, which indicates that the maximum number of paged UEs corresponding to the first type of paging time unit is 16. For another example, a paging configuration parameter maxPageRec 2=32 is acquired from the system message, which indicates that the maximum number of paged UEs corresponding to the first type of paging time unit is 32.

At 802, the network sends the paging message according to the paging configuration parameter.

According to the technical solution of the embodiment of the disclosure, different paging messages are allowed to support different maximum numbers of UEs, that is, the maximum numbers of UEs that may be simultaneously paged in different paging time units may be different, and the paging resources can be taken advantages of to send paging messages. In addition, some paging time units are supported to page a greater number of UEs, thereby reducing the number of required paging time units, and reducing a paging message overhead.

Figure 9:
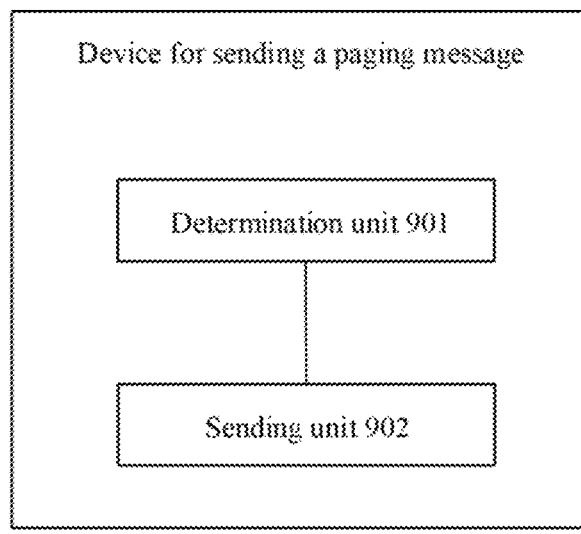
FIG. 9 is a first structure composition diagram of a device for sending a paging message according to an embodiment of the disclosure.

FIG. 9 is a first structure composition diagram of a device for sending a paging message according to an embodiment of the disclosure. As shown in FIG. 9, the device for sending a paging message includes a determination unit 901 and a sending unit 902.

The determination unit 901 is configured to determine the maximum number of UEs paged by a paging message according to a paging configuration parameter. The paging configuration parameter includes configuration information of a paging time unit and information on the maximum number of paged UEs corresponding to the paging time unit. The paging time unit at least includes a first type of paging time unit and a second type of paging time unit, and different types of paging time units correspond to maximum numbers of paged UEs respectively.

The sending unit 902 is configured to send the paging message according to the paging configuration parameter.

In an embodiment, the first type of paging time unit and the second type of paging time unit correspond to different maximum numbers of paged UEs.

In an embodiment, the first type of paging time unit corresponds to a first type of time-frequency resource, and the second type of paging time unit corresponds to a second type of time-frequency resource.

In an embodiment, a time-frequency resource size corresponding to the first type of time-frequency resource is different from a time-frequency resource size corresponding to the second type of time-frequency resource; and/or, a time-frequency resource multiplexing manner of the first type of time-frequency resource with an SS block is different from a time-frequency resource multiplexing manner of the second type of time-frequency resource with the SS block.

In an embodiment, the first type of paging time unit corresponding to the first type of time-frequency resource includes the following condition.

On a symbol where a nominal resource for sending the SS block is arranged, a time-frequency resource corresponding to the first type of paging time unit and the nominal resource are frequency-divisional.

In an embodiment, the second type of paging time unit corresponding to the second type of time-frequency resource includes the following condition.

On a symbol where a nominal resource for not sending the SS block is arranged, a time-frequency resource corresponding to the second type of paging time unit includes a time-frequency resource where the nominal resource is arranged.

In an embodiment, the paging time unit includes a PO or a part of time units in the PO.

Those skilled in the art should know that functions realized by each unit in the device for sending a paging message shown in FIG. 9 may be understood with reference to related descriptions about the method for sending a paging message. The functions of each unit in the device for sending a paging message shown in FIG. 9 may be implemented through a program running in a processor, and may also be implemented through a specific logical circuit.

FIG. 10 is a second flowchart of a method for sending a paging message according to an embodiment of the disclosure. As shown in FIG. 10, the method for sending a paging message includes the following operations.

At 1001, a UE receives a paging message sent by a network according to a paging configuration parameter. The paging configuration parameter is configured to determine the maximum number of UEs paged by the paging message. The paging configuration parameter includes configuration information of a paging time unit and information on the maximum number of paged UEs corresponding to the paging time unit. The paging time unit at least includes a first type of paging time unit and a second type of paging time unit, and different types of paging time units correspond to maximum numbers of paged UEs respectively.

In the embodiment of the disclosure, the first type of paging time unit and the second type of paging time unit correspond to different maximum numbers of paged UEs.

In the embodiment of the disclosure, the first type of paging time unit corresponds to a first type of time-frequency resource, and the second type of paging time unit corresponds to a second type of time-frequency resource.

Furthermore, a time-frequency resource size corresponding to the first type of time-frequency resource is different from a time-frequency resource size corresponding to the second type of time-frequency resource; and/or a time-frequency resource multiplexing manner of the first type of time-frequency resource with an SS block is different from a time-frequency resource multiplexing manner of the second type of time-frequency resource with the SS block.

In the solution, the first type of paging time unit corresponding to the first type of time-frequency resource type includes the following condition.

On a symbol where a nominal resource for sending the SS block is arranged, a time-frequency resource corresponding to the first type of paging time unit and the nominal resource are frequency-divisional.

In the solution, the second type of paging time unit corresponding to the type of second time-frequency resource includes the following condition.

On a symbol where a nominal resource for not sending the SS block is arranged, a time-frequency resource corresponding to the second type of paging time unit may include a time-frequency resource where the nominal resource is arranged.

In the embodiment of the disclosure, the paging time unit includes a PO or a part of time units in the PO.

FIG. 11 is a second structure composition diagram of a device for sending a paging message according to an embodiment of the disclosure. As shown in FIG. 11, the device for sending a paging message includes a receiving unit 1101.

The receiving unit 1101 is configured to receive a paging message sent by a network according to a paging configuration parameter. The paging configuration parameter is configured to determine the maximum number of UEs paged by the paging message. The paging configuration parameter includes configuration information of a paging time unit and information on the maximum number of paged UEs corresponding to the paging time unit. The paging time unit at least includes a first type of paging time unit and a second type of paging time unit, and different types of paging time units correspond to maximum numbers of paged UEs respectively.

In an embodiment, the first type of paging time unit and the second type of paging time unit correspond to different maximum numbers of paged UEs In an embodiment, the first type of paging time unit corresponds to a first type of time-frequency resource, and the second type of paging time unit corresponds to a second type of time-frequency resource.

In an embodiment, a time-frequency resource size corresponding to the first type of time-frequency resource is different from a time-frequency resource size corresponding to the second type of time-frequency resource; and/or a time-frequency resource multiplexing manner of the first type of time-frequency resource with an SS block is different from a time-frequency resource multiplexing manner of the second type of time-frequency resource with the SS block.

In an embodiment, the first type of paging time unit corresponding to the first type of time-frequency resource includes the following condition.

On a symbol where a nominal resource for sending the SS block is arranged, a time-frequency resource corresponding to the first type of paging time unit and the nominal resource are frequency-divisional.

In an embodiment, the second type of paging time unit corresponding to the second type of time-frequency resource includes the following condition.

On a symbol where a nominal resource for not sending the SS block is arranged, a time-frequency resource corresponding to the second type of paging time unit may include a time-frequency resource where the nominal resource is arranged.

In an embodiment, the paging time unit includes a PO or a part of time units in the PO.

When being implemented in form of software functional module and sold or used as an independent product, the device for sending a paging message of the embodiment of the disclosure may be stored in a computer-readable storage medium. Based on such an understanding, a substantial part of the technical solutions of the embodiments of the disclosure or a part of the technical solutions which makes contributions to the conventional art may be embodied in form of software product. The computer software product is stored in a storage medium, including a plurality of instructions configured to enable a computer device (which may be a personal computer, a server, a network device or the like) to execute all or part of the method in each embodiment of the disclosure. The storage medium includes various media capable of storing program codes such as a U disk, a mobile hard disk, a Read Only Memory (ROM), a magnetic disk or an optical disk. Therefore, the embodiments of the disclosure are not limited to any specific hardware and software combination.

Correspondingly, the embodiments of the disclosure also provide a computer storage medium, in which a computer-executable instruction is stored. The computer-executable instruction, when being executed by a processor, implements the method for sending a paging message of the embodiments of the disclosure.

Figure 12:
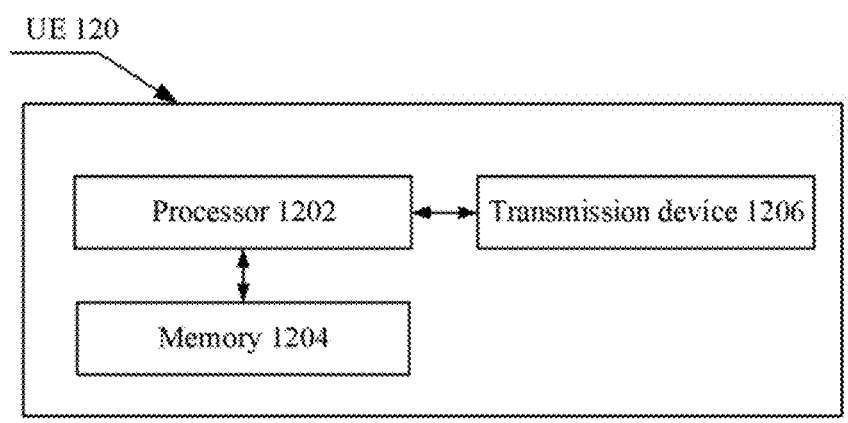
FIG. 12 is a structure composition diagram of a UE according to an embodiment of the disclosure.

FIG. 12 is a structure composition diagram of a UE according to an embodiment of the disclosure. As shown in FIG. 12, the UE 200 may include one or more (only one is illustrated in FIG. 12) processors 1202 (the processor 1202 may include, but be not limited to, a processing device such as a Micro Controller Unit (MCU) or a Field Programmable Gate Array (FPGA)), a memory 1204 configured to store data and a transmission device 1200 configured for a communication function. Those of ordinary skill in the art should know that the structure shown in FIG. 12 is only schematic and not intended to limit the structure of the electronic device. For example, the UE 200 may further include components more or fewer components than the components shown in FIG. 12 or has a configuration different from that shown in FIG. 12.

The memory 1204 may be configured to store a software program and module of application software, for example, a program instruction/module corresponding to a method for sending a paging message in the embodiments of the disclosure. The processor 1202 runs the software program and module stored in the memory 1204, to execute various functional applications and data processing, that is, for implementing the abovementioned method. The memory 1204 may include a high-speed random access memory and may also include a nonvolatile memory, for example, one or more magnetic storage devices, flash memories or other nonvolatile solid-state memories. In some examples, the memory 1204 may further include a memory arranged remotely relative to the processor 1202, and the remote memory may be connected to the UE 200 through a network. An example of the network includes, but is not limited to, the Internet, an intranet, a local area network, a mobile communication network and a combination thereof.

The transmission device 1206 is configured to receive or send data through a network. A specific example of the network may include a wireless network provided by a communication provider of the UE 200. In an example, the transmission device 1206 includes a Network Interface Controller (NIC), which may be connected with another network device through a base station, thereby communicating with the Internet. In an example, the transmission device 1206 may be a Radio Frequency (RF) module, which is configured to communicate with the Internet in a wireless manner.

The technical solutions recorded in the embodiments of the disclosure may be freely combined without conflicts.

In some embodiments provided by the disclosure, it should be understood that the disclosed method and intelligent device may be implemented in another manner. The device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between displayed or discussed components may be indirect coupling or communication connection, implemented through some interfaces, between the device or the units, and may be electrical and mechanical or in other forms.

The units described above as separate components may or may not be physically separated, and components displayed as units may or may not be physical units. That is, the components may be arranged in the same place, or may also be distributed to multiple network units. A part of all of the units may be selected according to a practical requirement to achieve the purposes of the solutions of the embodiments.

In addition, functional units in each embodiment of the disclosure may be integrated into a second processing unit, each of the functional units may also serve as an independent unit, or two or more than two functional units may also be integrated into a unit. The integrated unit may be implemented in a hardware form and may also be implemented in form of hardware and software functional unit.

The foregoing is only the specific embodiments of the disclosure, and the scope of protection of the disclosure is not limited thereto. Any variations or replacements apparent to those skilled in the art within the technical scope disclosed by the disclosure shall fall within the scope of protection of the disclosure.

The invention claimed is:

1. A method for receiving a paging message, comprising:
configuring, by a network, a paging time unit, the paging time unit comprising at least a first type of paging time unit corresponding to a first maximum number of paged UEs and a second type of paging time unit corresponding to a second maximum number of paged UEs;
configuring, by the network, a paging configuration parameter, the paging configuration parameter comprising the paging time unit and information on the maximum number of paged UEs corresponding to the paging time unit;
sending, by the network, a paging message according to the paging configuration parameter;
receiving, by a UE, the paging message; and
determining, by the UE, based on the paging configuration parameter, a value of the paging time unit.

2. The method of claim 1, wherein the maximum number of paged UEs corresponding to the first type of paging time unit is different from the maximum number of paged UEs corresponding to the second type of paging time unit.

3. The method of claim 1, wherein the first type of paging time unit corresponds to a first type of time-frequency resource, and the second type of paging time unit corresponds to a second type of time-frequency resource.

4. The method of claim 3, wherein a time-frequency resource site corresponding to the first type of time-frequency resource is different from a time-frequency resource size corresponding to the second type of time-frequency resource;
and/or a time-frequency resource multiplexing manner for the first type of time-frequency resource with a Synchronization Signal (SS) block is different from a time-frequency resource multiplexing manner of the second type of time-frequency resource with the SS block.

5. The method of claim 3, wherein the first type of paging time unit corresponding to the first type of time-frequency resource comprises: a time-frequency resource corresponding to the first type of paging time unit and a nominal resource for sending a Synchronization Signal (SS) block being frequency-divisional, on a symbol where the nominal resource for sending the SS block is arranged.

6. The method of claim 3, wherein the second type of paging time unit corresponding to the second type of time-frequency resource comprises: a time-frequency resource corresponding to the second type of paging time unit comprising a time-frequency resource where a nominal resource for not sending a Synchronization Signal (SS) block is arranged on a symbol where the nominal resource for not sending the SS block is arranged.

7. The method of claim 1, wherein the paging time unit comprises a Paging Occasion (PO) or a part of time units in the PO.

8. A device for sending a paging message, the device being configured to:
configure, by a network, a paging time unit, the paging time unit comprising at least a first type of paging time unit corresponding to a first maximum number of paged UEs and a second type of paging time unit corresponding to a second maximum number of paged UEs;
configure, by the network, a paging configuration parameter, the paging configuration parameter comprising the paging time unit and information on the maximum number of paged UEs corresponding to the paging time unit;
send, by the network, a paging message according to the paging configuration parameter;
receive, by a UE, the paging message; and
determine, by the UE, based on the paging configuration parameter, a value of the paging time unit.

9. The device of claim 8, wherein the maximum number of paged UEs corresponding to the first type of paging time unit is different from the maximum number of paged UEs corresponding to the second type of paging time unit.

10. The device of claim 8, wherein the first type of paging time unit corresponds to a first type of time-frequency resource, and the second type of paging time unit corresponds to a second type of time-frequency resource.

11. The device of claim 10, wherein a time-frequency resource si/e corresponding to the first type of time-frequency resource is different from a time-frequency resource site corresponding to the second type of time-frequency resource, and/or a time-frequency resource multiplexing manner for the first type of time-frequency resource with a Synchronization Signal (SS) block is different from a time-frequency resource multiplexing manner of the second type of time-frequency resource with the SS block.

12. The device of claim 10, wherein the first type of paging time unit corresponding to the first type of time-frequency resource comprises: a time-frequency resource corresponding to the first type of paging time unit and a nominal resource for sending a Synchronization Signal (SS) block being frequency-divisional on a symbol where the nominal resource for sending the SS block is arranged.

13. The device of claim 10, wherein the second type of paging time unit corresponding to the second type of time-frequency resource comprises: a time-frequency resource corresponding to the second type of paging time unit comprising a time-frequency resource where a nominal resource for not sending a Synchronization Signal (SS) block is arranged, on a symbol where the nominal resource for not sending the SS block is arranged.

14. The device of claim 8, wherein the paging time unit comprises a Paging Occasion (PO) or a part of time units in the PO.

\* \* \* \* \*